US006956730B2

(12) United States Patent
Togashi

(10) Patent No.: US 6,956,730 B2
(45) Date of Patent: Oct. 18, 2005

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/916,455

(22) Filed: Aug. 12, 2004

(65) Prior Publication Data

US 2005/0047059 A1     Mar. 3, 2005

(30) Foreign Application Priority Data

Aug. 29, 2003   (JP)   ............................. 2003-305995

(51) Int. Cl.[7] .......................... H01G 4/228; H01G 4/06

(52) U.S. Cl. .................... 361/309; 361/311; 361/306.3

(58) Field of Search ............................. 361/303, 306.1, 361/306.2, 308.1, 309, 311–313

(56) References Cited

U.S. PATENT DOCUMENTS 4,831,494 A * 5/1989 Arnold et al. ........... 361/306.3

FOREIGN PATENT DOCUMENTS

| JP | 2657953 | 6/1997 |
|---|---|---|
| JP | 11-144996 | 5/1999 |
| JP | 11-204372 | 7/1999 |
| JP | 11-288839 | 10/1999 |
| JP | 2001-284171 | 10/2001 |

* cited by examiner

Primary Examiner—Eric W. Thomas
(74) Attorney, Agent, or Firm—Oblon, Spivak, McClelland, Maier & Neustadt, P.C.

(57) ABSTRACT

A multilayer capacitor includes: a dielectric element; two kinds of terminal internal conductors and two kinds of connecting internal conductors both disposed in the dielectric element; two kinds of terminal electrodes; and two kinds of external electrodes, wherein: the terminal internal conductor of one kind has a first terminal-side leadout portion led out to one face of the dielectric element and a first external-side leadout portion led out to the other face, and the terminal internal conductor of the other kind has a second terminal-side leadout portion led out to the one face and a second external-side leadout portion led out to the other face; the connecting internal conductor of one kind has a third external-side leadout portion led out to the other face, and the connecting internal conductor of the other kind has a fourth external-side leadout portion led out to the other face; the terminal electrode of one kind is connected to the first terminal-side leadout portion, and the terminal electrode of the other kind is connected to the second terminal-side leadout portion; and the external electrode of one kind is connected to the first external-side leadout portion and the third external-side leadout portion, and the external electrode of the other kind is connected to the second external-side leadout portion and the fourth external-side leadout portion. Therefore, a multilayer capacitor easily realizing a higher capacity and reduced ESL is obtained.

26 Claims, 10 Drawing Sheets

F I G. 6
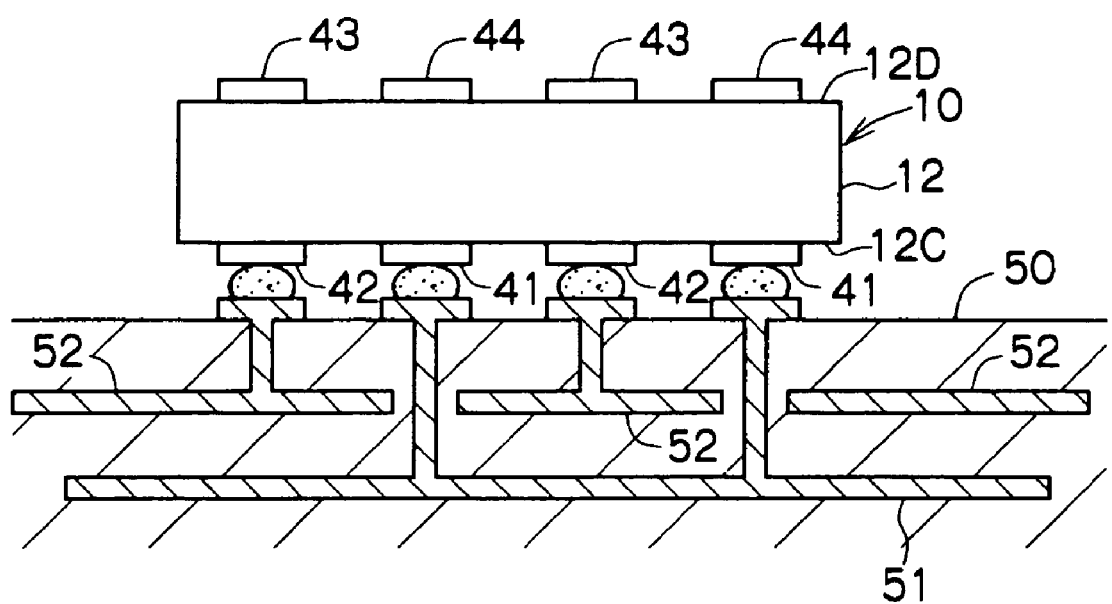

F I G. 1 3 (A)
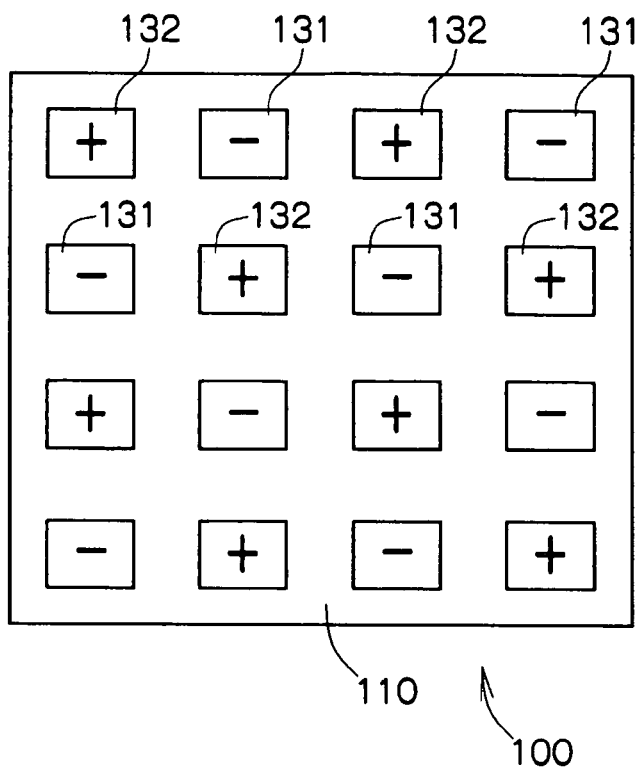
F I G. 1 3 (B)
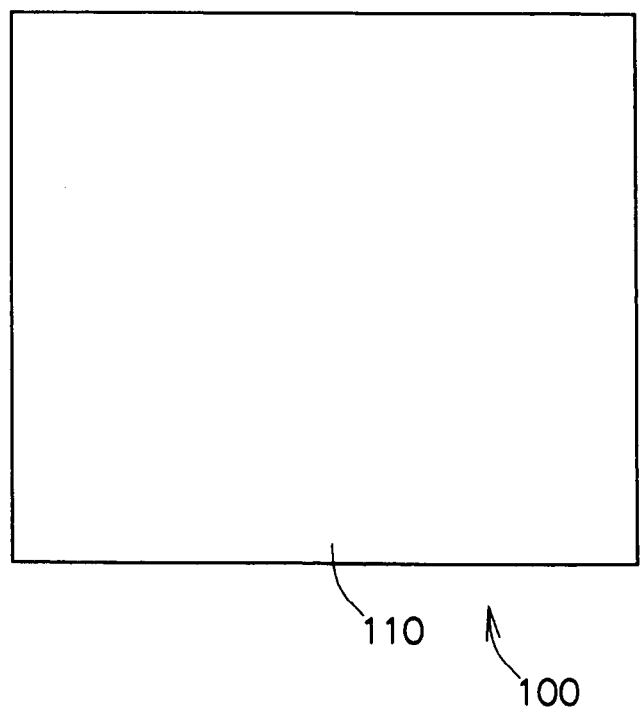

MULTILAYER CAPACITOR

BACKGROUND OF THE INVENTION

1. Field of the Invention

The present invention relates to a multilayer capacitor that easily realizes a higher capacity as well as reduced ESL, and more particularly, to that suitable for use as a multilayer ceramic capacitor for achieving a high effect as a power source of a CPU.

2. Description of the Related Art

In recent years, due to an improved processing speed and a higher integration degree of a CPU (central processing unit) used for a data processor, its operating frequency is becoming higher and its current consumption is remarkably increasing. In accordance therewith, the operating voltage has been on the decreasing trend due to decreased power consumption. This has caused the occurrence of a higher-speed and larger current fluctuation in a power source for supplying power to the CPU, and it has become very difficult to control voltage fluctuation accompanying this current fluctuation within an allowable value range of this power source.

Therefore, as a measure for stabilizing the power source, a multilayer capacitor called a decoupling capacitor are frequently used in the state of being connected to a power source. By quick charge/discharge at the time of a high-speed transient current fluctuation, the multilayer capacitor supplies a current to a CPU, thereby reducing the voltage fluctuation of the power source.

However, today's trend toward a still higher frequency of the operating frequency of the CPU has resulted in higher-speed and larger current fluctuation. In accordance with consequent relative increase in equivalent series inductance (ESL) that the multilayer capacitor itself has, effective inductance has become larger. As a result, this equivalent series inductance gives a significant influence to the voltage fluctuation of the power source, so that it is not possible to respond to the future increase in processing speed of a CPU.

This is because that the voltage fluctuation at the time of the charge/discharge, in other words, at a current transient time, is approximated by the following expression 1, and the size of ESL is correlated with the magnitude of the voltage fluctuation.

$$dV = ESL \cdot di/dt \qquad \text{Expression 1}$$

where dV is voltage fluctuation (V) at the transient time, "i" is a current fluctuation amount (A), and "t" is a fluctuation duration (second).

Another conventional capacitor achieving ESL reduction by the structure such that a plurality of terminal electrodes are formed on a lower face which is on a substrate surface side of a multilayer body is concretely shown in FIG. 11 to FIG. 13(B), and a conventional multilayer capacitor 100 will be described below based on these drawings.

Specifically, the conventional multilayer capacitor 100 is structured such that two kinds of dielectric sheets 111, 112 having internal conductors 101, 102 and dielectric sheets 113 without any internal conductor formed thereon are stacked as shown in FIG. 11 to form a dielectric element 110, which is a multilayer body shown in FIG. 12, FIG. 13(A), and FIG. 13(B). Further, the multilayer capacitor 100 is structured such that a plurality of leadout portions 101A, 102A led out from the internal conductors 101, 102 on the dielectric sheets 111, 112 protrude to one face of the dielectric element 110.

The multilayer capacitor 100 is structured such that it includes a plurality of multilayer blocks 121 each formed of the dielectric sheets 111, 112 that have the internal conductors 101, 102, and multilayer blocks 122 each formed of the dielectric sheets 113 without any internal conductor and the multilayer blocks 121 are stacked alternately. As shown in FIG. 12 and FIG. 13(A), terminal electrodes 131, 132 are provided on an outer face of the dielectric element 110 to correspond to the leadout portions 101A, 102A, and these terminal electrodes 131, 132 are arranged so that the terminal electrodes adjacent to each other have different polarity from each other.

Therefore, as for the directions of currents flowing into the terminal electrodes 131, 132, the directions in the terminal electrodes adjacent to each other become reverse to each other when the multilayer capacitor 100 is mounted on a multilayer substrate 50 shown in FIG. 12, so that a magnetic flux canceling effect acts between the terminal electrodes adjacent to each other to reduce ESL. However, due to the existence of the plural multilayer blocks 122 that do not function as capacitors in the dielectric element 100, it is difficult for the multilayer capacitor 100 as structured above to have an increased capacity.

SUMMARY OF THE INVENTION

In view of the above-described circumstances, it is an object of the present invention to provide a multilayer capacitor easily realizing a higher capacity as well as reduced ESL, thereby achieving a higher effect as a power source of a CPU.

According to one of the modes of the present invention, provided is a multilayer capacitor including: a dielectric element formed of a stack of dielectric layers to be in a rectangular parallelepiped shape; two kinds of terminal internal conductors and two kinds of connecting internal conductors disposed in the dielectric element, being separated from each other by the dielectric layer; two kinds of terminal electrodes disposed on one face out of two faces opposite to each other of the dielectric element; and two kinds of external electrodes disposed on the other face of the dielectric element, wherein: the terminal internal conductor of one kind has a first terminal-side leadout portion led out to the one face out of the two faces opposite to each other of the dielectric element and a first external-side leadout portion led out to the other face, and the terminal internal conductor of the other kind has a second terminal-side leadout portion led out to the one face and a second external-side leadout portion led out to the other face; the connecting internal conductor of one kind has a third external-side leadout portion led out to the other face, and the connecting internal conductor of the other kind has a fourth external-side leadout portion led out to the other face; the terminal electrode of one kind is connected to the first terminal-side leadout portion, and the terminal electrode of the other kind is connected to the second terminal-side leadout portion; and the external electrode of one kind is connected to the first external-side leadout portion and the third external-side leadout portion, and the external electrode of the other kind is connected to the second external-side leadout portion and the fourth external-side leadout portion.

The multilayer capacitor as structured above has the following operation.

In the multilayer capacitor according to this mode, two kinds of the terminal internal conductors and two kinds of the connecting internal conductors are arranged in the dielectric element which is formed of a stack of the dielectric layers to be in the rectangular parallelepiped shape, being separated from each other by the dielectric layers respectively. Further, the terminal internal conductor of one kind has the first terminal-side leadout portion led out to one face out of the two faces opposite to each other of the dielectric element and the first external-side leadout portion led out to the other face. The terminal internal conductor of the other kind has the second terminal-side leadout portion led out to the one face and the second external-side leadout portion led out to the other face.

Further, the connecting internal conductor of one kind has the third external-side leadout portion led out to the other face, and the connecting internal conductor of the other kind has the fourth external-side leadout portion led out to the other face.

Two kinds of the terminal electrodes are disposed on the one face out of the two faces opposite to each other of the dielectric element, the terminal electrode of one kind out of the two kinds being connected to the first terminal-side leadout portion and the terminal electrode of the other kind being connected to the second terminal-side leadout portion. Further, two kinds of the external electrodes are disposed on the other face of the dielectric element, the external electrode of one kind being connected to the first external-side leadout portion and the third external-side leadout portion, and the external electrode of the other kind being connected to the second external-side leadout portion and the fourth external-side readout portion.

Therefore, the terminal electrode of the one kind is connected to the terminal internal conductor of the one kind via the first terminal-side readout portion, and the terminal electrode of the other kind is connected to the terminal internal conductor of the other kind via the second terminal-side readout portion. Further, the external electrode of the one kind is connected to the terminal internal conductor of the one kind via the first external-side readout portion and is connected to the connecting internal conductor of the one kind via the third external-side leadout portion. The external electrode of the other kind is connected to the terminal internal conductor of the other kind via the second external-side leadout portion and is connected to the connecting internal conductor of the other kind via the fourth external-side leadout portion.

This results in a structure such that not only two kinds of the terminal internal conductors connected via two kinds of the terminal electrodes to a substrate or the like provided outside the multilayer capacitor but also two kinds of connecting internal conductors connected to two kinds of the terminal internal conductors via the external electrodes are disposed in the dielectric element. Therefore, no multilayer block that does not function as a capacitor exists in the dielectric element.

In addition, two kinds of the terminal electrodes are alternately arranged on the one face of the dielectric element of the multilayer capacitor, so that the terminal electrodes adjacent to each other are different in polarity. Therefore, as for the directions of currents flowing into the terminal electrodes, the directions in the adjacent terminal electrodes become reverse to each other, so that a magnetic flux canceling effect acts between the adjacent terminal electrodes to reduce ESL.

Consequently, in the multilayer capacitor having the structure of this mode, not only ESL is reduced but also no multilayer block not functioning as a capacitor exists in the dielectric element. This makes it possible to increase capacitance compared with that of a conventional multilayer capacitor. Therefore, according to this mode, it is possible to obtain a multilayer capacitor easily realizing a higher capacity as well as reduced ESL, and this multilayer capacitor has a higher effect as a power source of a CPU.

According to another mode of the present invention, provided is a multilayer capacitor including: a dielectric element formed of a stack of dielectric layers to be in a rectangular parallelepiped shape; two kinds of terminal internal conductors and two kinds of connecting internal conductors disposed in the dielectric element, being separated from each other by the dielectric layer; two kinds of terminal electrodes disposed on one face out of two faces opposite to each other of the dielectric element; and two kinds of external electrodes disposed on the other face of the dielectric element, wherein: two kinds of the terminal internal conductors form a plurality of first multilayer blocks, and two kinds of the connecting internal conductors form at least one second multilayer block, the second multilayer block being interposed between the first multilayer blocks; the terminal internal conductor of one kind has a first terminal-side leadout portion led out to the one face out of the two faces opposite to each other of the dielectric element and a first external-side readout portion led out to the other face, and the terminal internal conductor of the other kind has a second terminal-side leadout portion led out to the one face and a second external-side readout portion led out to the other face; the connecting internal conductor of one kind has a third external-side readout portion led out to the other face, and the connecting internal conductor of the other kind has a fourth external-side readout portion led out to the other face; the terminal electrode of one kind is connected to the first terminal-side readout portion, and the terminal electrode of the other kind is connected to the second terminal-side leadout portion; and the external electrode of one kind is connected to the first external-side readout portion and the third external-side readout portion, and the external electrode of the other kind is connected to the second external-side leadout portion and the fourth external-side readout portion The multilayer capacitor as structured above has the following operation.

The multilayer capacitor according to this mode includes the same structure as that of the multilayer capacitor according to the mode previously described. It further includes the structure such that it has the plural first multilayer blocks each formed of two kinds of the terminal internal conductors and at least one second multilayer block formed of two kinds of the connecting internal conductors, and the dielectric element has a multilayer structure with the second multilayer block being sandwiched by the first multilayer blocks.

Therefore, since the second multilayer block having no readout portion led out to one face of the dielectric element on which the terminal electrodes exist is interposed between the first multilayer blocks, it is possible to surely provide a gap between two kinds of the terminal electrodes disposed on this one face. This makes it possible to more surely achieve the operation and effect of the above-described mode.

According to still another mode of the present invention, provided is a multilayer capacitor including: a dielectric element formed of a stack of dielectric layers to be in a rectangular parallelepiped shape; two kinds of terminal internal conductors and two kinds of connecting internal conductors disposed in the dielectric element, being separated from each other by the dielectric layer; two kinds of terminal electrodes disposed on one face out of two faces opposite to each other of the dielectric element; and two kinds of external electrodes disposed on the other face of the dielectric element, wherein: the terminal internal conductor of one kind has a first terminal-side leadout portion led out to the one face out of the two faces opposite to each other of the dielectric element and a first external-side readout portion led out to the other face, and the terminal internal conductor of the other kind has a second terminal-side leadout portion led out to the one face and a second external-side leadout portion led out to the other face; the connecting internal conductor of one kind has a third external-side readout portion led out to the other face, and the connecting internal conductor of the other kind has a fourth external-side readout portion led out to the other face; two kinds of the terminal electrodes are both provided in plurality on the one face of the dielectric element, the terminal electrodes adjacent to each other being different in kind; the terminal electrode of one kind is connected to the first terminal-side leadout portion, and the terminal electrode of the other kind is connected to the second terminal-side leadout portion; and the external electrode of one kind is connected to the first external-side leadout portion and the third external-side leadout portion, and the external electrode of the other kind is connected to the second external-side leadout portion and the fourth external-side leadout portion.

The multilayer capacitor as structured above has the following operation.

The multilayer capacitor according to this mode includes the same structure as that of the multilayer capacitor according to the modes previously described. It further includes the structure such that two kinds of the terminal electrodes are both provided in plurality, and two kinds of the terminal electrodes are arranged on the one face of the dielectric element, the terminal electrodes adjacent to each other being different in kind.

Therefore, when two kinds of the terminal electrodes exist both in plurality, two kinds of the terminal electrodes are disposed on the one face of the dielectric element with the terminal electrodes different in kind being adjacent to each other, so that two kinds of the terminal electrodes are both arranged in a zigzag pattern. In accordance therewith, the terminal electrodes with the same polarity exist in the zigzag pattern. Therefore, two kinds of the terminal electrodes are alternately arranged both in the zigzag pattern, so that the magnetic flux canceling effect acts more strongly between the terminal electrodes adjacent to each other. This further ensures the achievement of the operation and effect of reducing ESL brought about by the modes previously described.

BRIEF DESCRIPTION OF THE DRAWINGS

FIG. 6 is a front view showing the state when the multilayer capacitor according to the first embodiment of the present invention is mounted on a multilayer substrate;

FIG. 13(A) is a bottom view showing the multilayer capacitor of the conventional example, and FIG. 13(B) is a top view showing the multilayer capacitor of the conventional example.

DETAILED DESCRIPTION OF THE PREFERRED EMBODIMENTS

Hereinafter, a first embodiment of the multilayer capacitor according to the present invention will be described based on the drawings.

FIG. 1 to FIG. 7(B) show a multilayer ceramic capacitor (hereinafter, simply referred to as a multilayer capacitor) 10 being the multilayer capacitor according to this embodiment. As seen in these drawings, the multilayer capacitor 10 includes, as a major portion thereof, a dielectric element 12 being a sintered compact in a parallelepiped shape that is obtained by sintering a multilayer body formed of a stack of a plurality of ceramic green sheets which are dielectric sheets.

Figure 1:
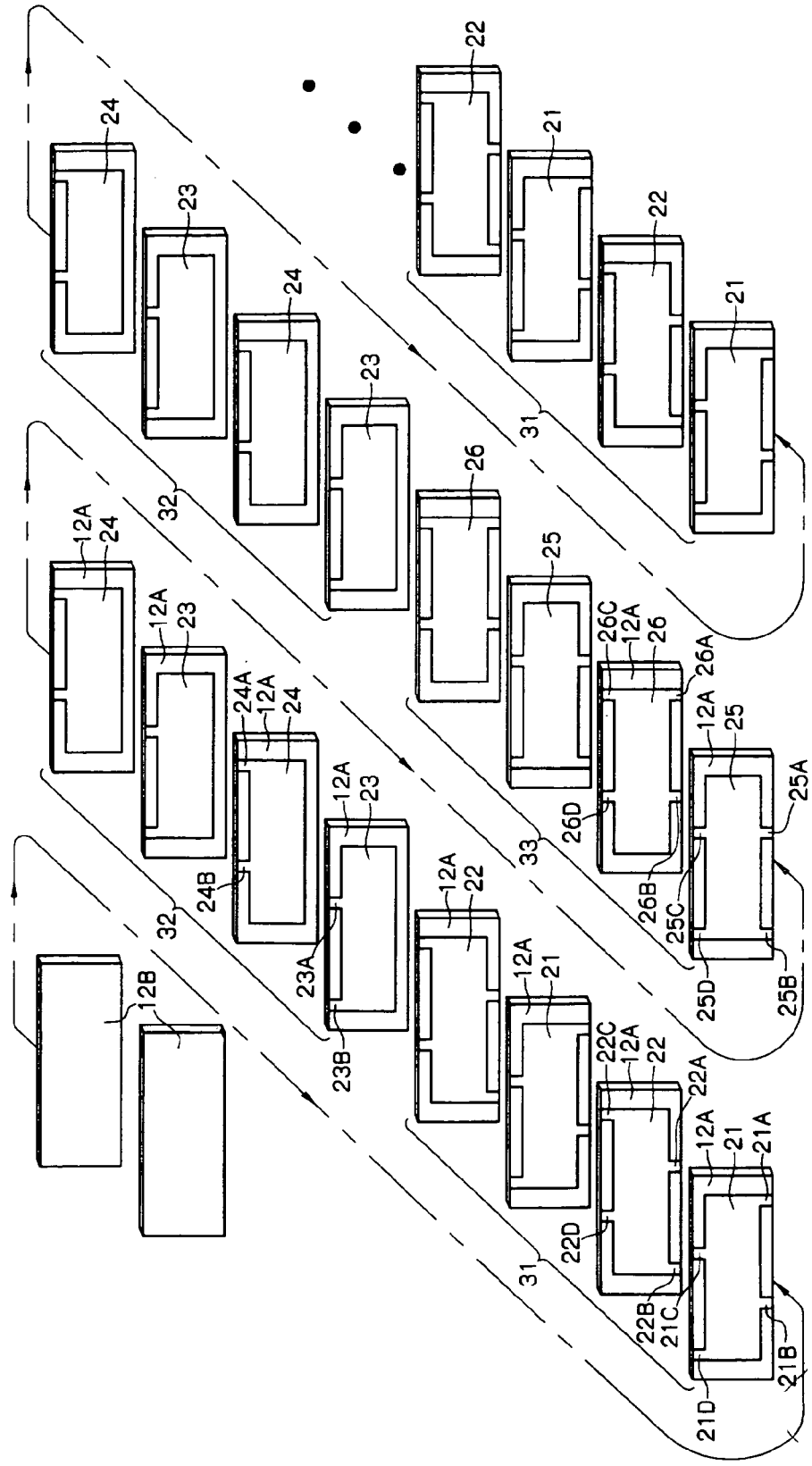
FIG. 1 is an exploded perspective view of a multilayer capacitor according to a first embodiment of the present invention.

As shown in FIG. 1, ceramic layers 12B without any internal conductor are disposed as protective layers (two layers in the drawing) at a front end of the dielectric element 12, and a planar internal conductor 21 is disposed at a position in the dielectric element 12 at the back of the ceramic layers 12B. An internal conductor 22 similarly in a planar shape is disposed at the back of the internal conductor 21 across a ceramic layer 12A being a dielectric layer in the dielectric element 12.

Further, an internal conductor 21 is disposed again at the back of the internal conductor 22 across a ceramic layer 12A, and an internal conductor 22 is disposed again at the back of this internal conductor 22 across a ceramic layer 12A. Therefore, two sets of the internal conductor 21 and the internal conductor 22 are arranged to face each other in the dielectric element 12, being separated from each other by the ceramic layers 12A.

Each of the internal conductors 21 has two leadout portions 21A, 21B led out to a lower face 12C which is one face out of two faces opposite to each other of the dielectric element 12, and two leadout portions 21C, 21D led out to an upper face 12D which is the other face. Each of the internal conductors 22 has two leadout portions 22A, 22B led out to the lower face 12C and two leadout portions 22C, 22D led out to the upper face 12D. Note that, as shown in FIG. 1, the two leadout portions 21A, 21B and the two leadout portions 22A, 22B are led out to positions different from each other, and the two leadout portions 21C, 21D and the two leadout portions 22C, 22D are led out to positions different from each other.

Therefore, in the dielectric element 12, two sets of the internal conductor 21 and the internal conductor 22 are arranged in sequence with the ceramic layer 12A, which is a sintered dielectric sheet, being sandwiched between the internal conductor 21 and the internal conductor 22, and the ceramic layer 12A being disposed also at a back end. These ceramic layers 12A and the internal conductors 21, 22 constitute a multilayer block 31.

Moreover, as shown in FIG. 1, a planar internal conductor 23 is disposed at the back of the multilayer block 31, and an internal conductor 24 similarly in a planar shape is disposed at the back of the internal conductor 23 across a ceramic layer 12A in the dielectric element 12. An internal conductor 23 is disposed again at the back of the internal conductor 24 across a ceramic layer 12A, and an internal conductor 24 is disposed again at the back of this internal conductor 23 across a ceramic layer 12A. Therefore, two sets of the internal conductor 23 and the internal conductor 24 are arranged in the dielectric element 12, being separated from each other by the ceramic layers 12A.

Each of the internal conductors 23 has two leadout portions 23A, 23B which are led out to the upper face 12D so as to be at the same positions as those of the leadout portions 21C, 21D of the internal conductor 21. Each of the internal conductors 24 has two leadout portions 24A, 24B which are led out to the upper face 12D so as to be at the same positions as those of the leadout portions 22C, 22D of the internal conductor 22.

Therefore, in the dielectric element 12, two sets of the internal conductor 23 and the internal conductor 24 are arranged in sequence with the ceramic layer 12A being sandwiched therebetween, and the ceramic layer 12A being disposed also at a back end. These ceramic layers 12A and the internal conductors 23, 24 constitute a multilayer block 32.

As shown in FIG. 1, a planar internal conductor 25 is further disposed at the back of the multilayer block 32, and an internal conductor 26 similarly in a planar shape is disposed at the back of the internal conductor 25 across a ceramic layer 12A in the dielectric element 12. An internal conductor 25 is disposed again at the back of the internal conductor 26 across a ceramic layer 12A, and an internal conductor 26 is disposed again at the back of this internal conductor 25 across a ceramic layer 12A. Therefore, these internal conductors 25 and internal conductors 26 are arranged in the dielectric element 12 to face each other, being separated from each other by the ceramic layers 12A.

Each of the internal conductors 25 has two leadout portions 25A, 25B which are led out to the lower face 12C so as to be at the same positions as those of the leadout portions 22A, 22B of the internal conductor 22, and two leadout portions 25C, 25D which are led out to the upper face 12D so as to be at the same positions as those of the leadout portions 21C, 21D of the internal conductor 21. Each of the internal conductors 26 has two leadout portions 26A, 26B which are led out to the lower face 12C so as to be at the same positions as those of the leadout portions 21A, 21B of the internal conductor 21, and two leadout portions 26C, 26D which are led out to the upper face 12D so as to be at the same positions as those of the leadout portions 22C, 22D of the internal conductor 22.

Therefore, the two leadout portions 25A, 25B and the two leadout portions 26A, 26B are led out to the positions different from each other, and the two leadout portions 25C, 25D and the two leadout portions 26C, 26D are led out to the positions different from each other.

Therefore, in the dielectric element 12, two sets of the internal conductor 25 and the internal conductor 26 are arranged in sequence with the ceramic layer 12A being sandwiched therebetween and the ceramic layer 12A being disposed also at the back end. These ceramic layers 12A and the internal conductors 25, 26 constitute a multilayer block 33.

In short, in this embodiment, the internal conductors 21, 22, 25, 26 serve as two kinds of terminal internal conductors, and thereamong, the internal conductors 21, 25 correspond to the terminal internal conductors of one kind and the internal conductors 22, 26 correspond to the terminal internal conductors of the other kind. Further, the internal conductors 23, 24 serve as two kinds of connecting internal conductors, and thereamong, the internal conductors 23 correspond to the connecting internal conductors of one kind and the internal conductors 24 correspond to the connecting internal conductors of the other kind. They are arranged in the dielectric element 12, being separated from each other by the ceramic layers 12A.

A multilayer block 32 is further disposed at the back of the multilayer block 33, and a multilayer block 31 is disposed at the back of this multilayer block 32. Further, thereafter, multilayers, namely, the multilayer blocks 31 to the multilayer blocks 33 are repeatedly stacked in sequence in the above-described order.

As a result, the multilayer block 31 and the multilayer block 33 serve as first multilayer blocks each formed of two kinds of the terminal internal conductors, and the multilayer block 32 serves as a second multilayer block formed of two kinds of the connecting internal conductors. Therefore, the dielectric element 12 has a multilayer structure such that the multilayer blocks 32 are interposed between the multilayer block 31 and the multilayer block 33 and between the multilayers block 33 and the multilayer block 31, respectively.

Incidentally, the centers of the internal conductors, namely, the internal conductors 21 to 26 described above are substantially aligned with the center of the dielectric element 12. The length and width dimensions of each of the internal conductors, namely, the internal conductors 21 to 26 are smaller than the lengths of the corresponding sides of the dielectric element 12. As a material of the internal conductors 21 to 26 each formed in a substantially rectangular shape, not only a base metal material such as nickel, a nickel alloy, copper, or a copper alloy are conceivable but also a material essentially made of this metal is conceivable.

Figure 2:
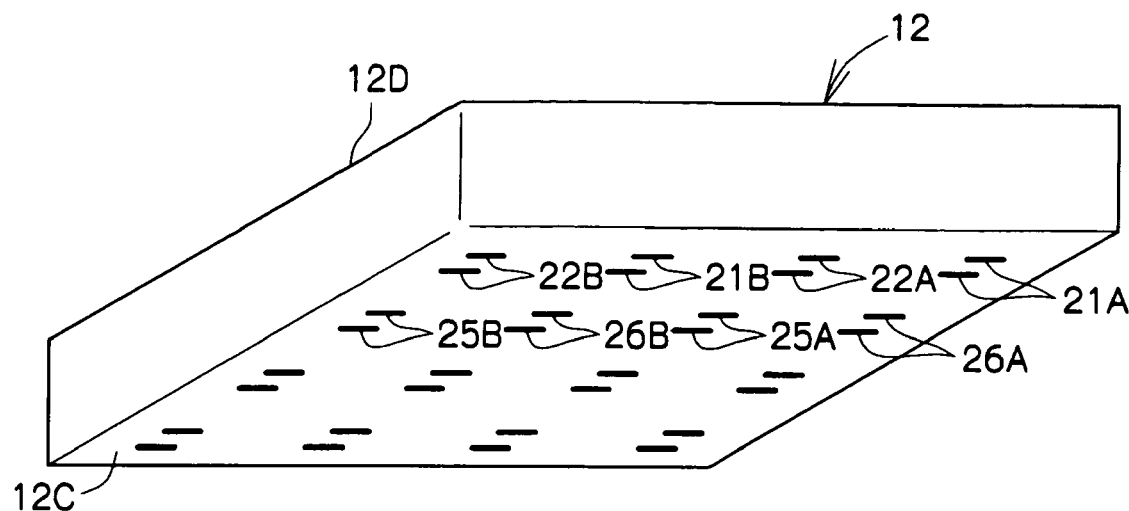
FIG. 2 is a perspective view of the multilayer capacitor according to the first embodiment of the present invention seen from the bottom before terminal electrodes are mounted thereon.
Figure 3:
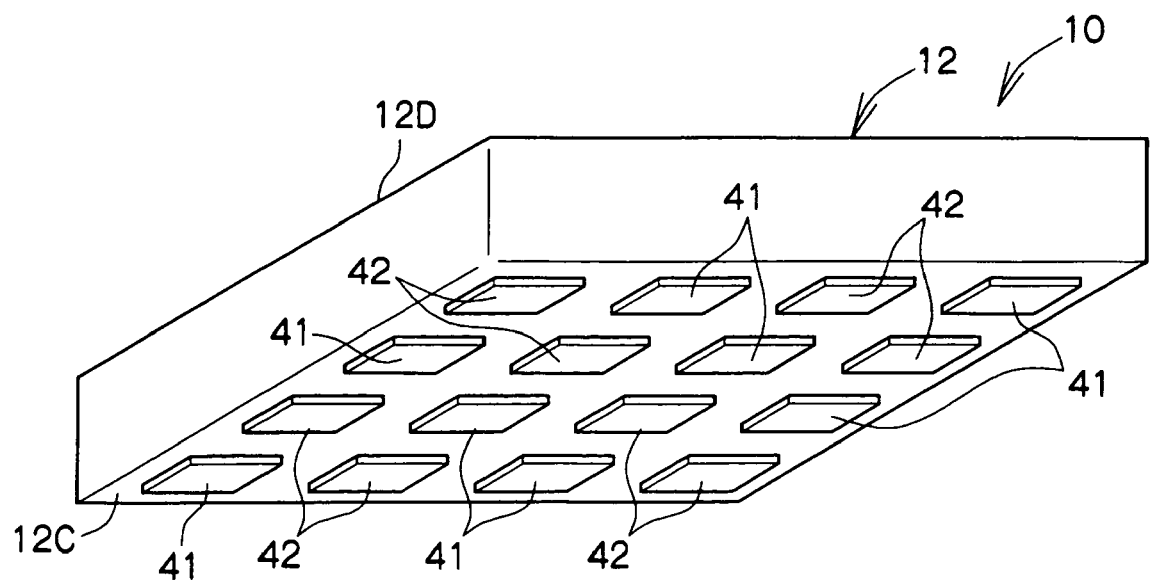
FIG. 3 is a perspective view of the multilayer capacitor according to the first embodiment of the present invention seen from the bottom.

As shown in FIG. 3, two kinds of terminal electrodes 41, 42 are both provided in plurality on the lower face 12C of the dielectric element 12. The readout portions 21A, the leadout portions 21B, the leadout portions 25A, and the leadout portions 25B, two each, which correspond to first terminal-side leadout portions, led out to the lower face 12C as shown in FIG. 2 are individually connected to the terminal electrodes 41 each formed in a quadrangle shape that approximates to a regular quadrangle shape. Further, the leadout portions 22A, the leadout portions 22B, the leadout portions 26A, and the leadout portions 26B, two each, which correspond to second terminal-side leadout portions, led out to the lower face 12C as shown in FIG. 2 are individually connected to the terminal electrodes 42 each formed in a quadrangle shape that approximates to a regular quadrangle shape.

As a result, two kinds of the terminal electrodes 41, 42 are arranged on the lower face 12C of the dielectric element 12 with the terminal electrodes 41, 42 different in kind being adjacent to each other as shown in FIG. 3.

Figure 4:
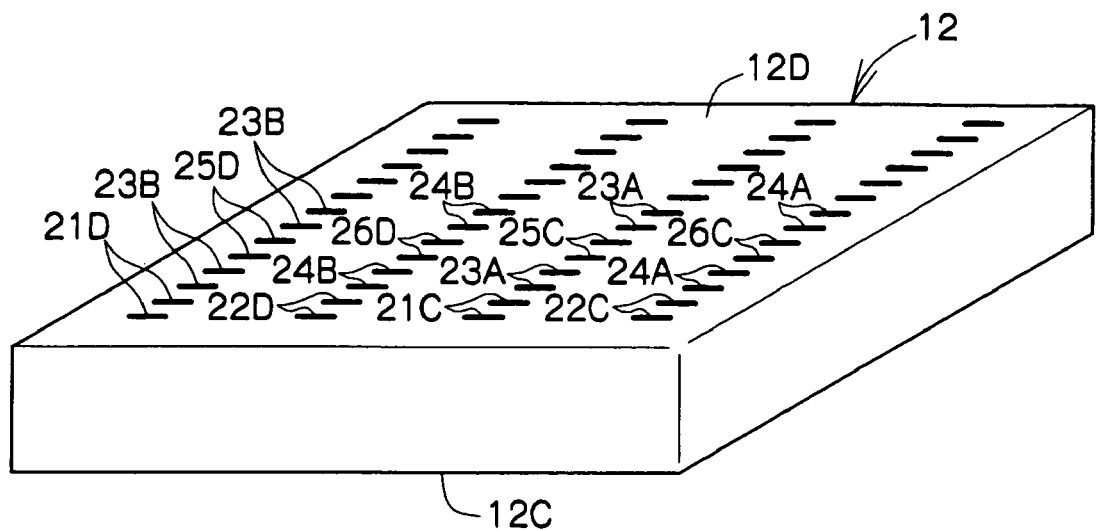
FIG. 4 is a perspective view of the multilayer capacitor according to the first embodiment of the present invention seen from the top before external electrodes are mounted thereon.
Figure 5:
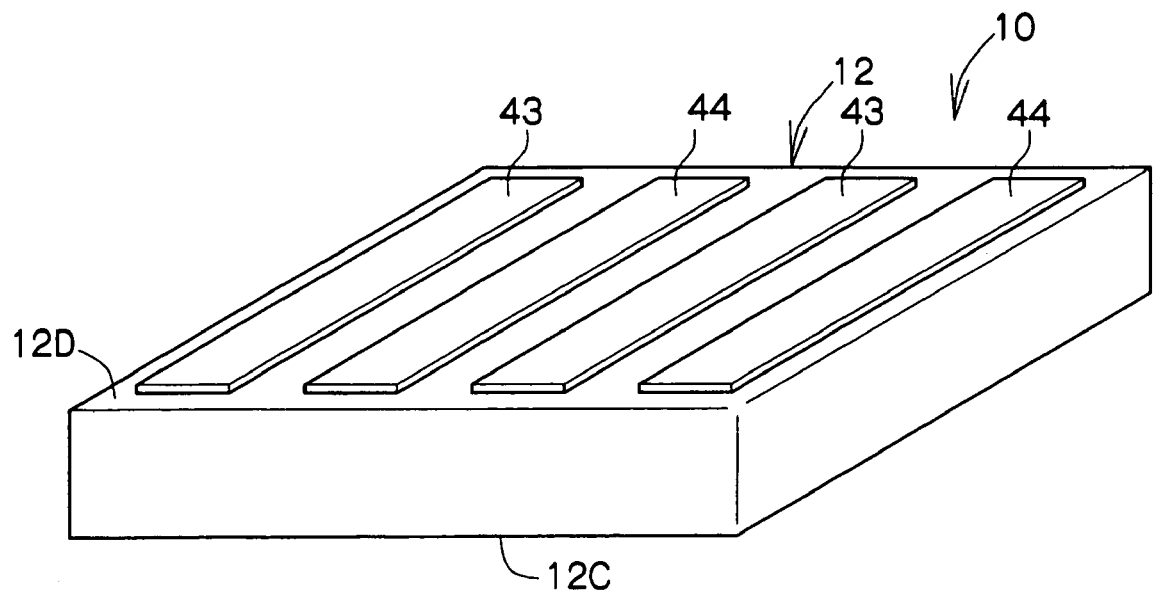
FIG. 5 is a perspective view of the multilayer capacitor according to the first embodiment of the present invention seen from the top.
Figure 7:
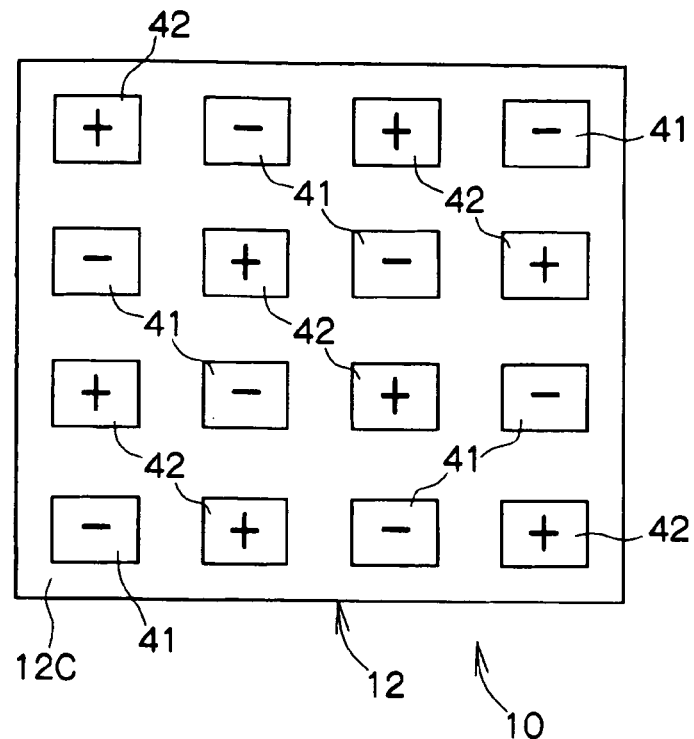
FIG. 7(A) is a bottom view showing the polarity of the terminal electrodes of the multilayer capacitor according to the first embodiment of the present invention.
FIG. 7(B) is a top view showing the polarity of the external electrodes of the multilayer capacitor according to the first embodiment of the present invention.
Figure 7:
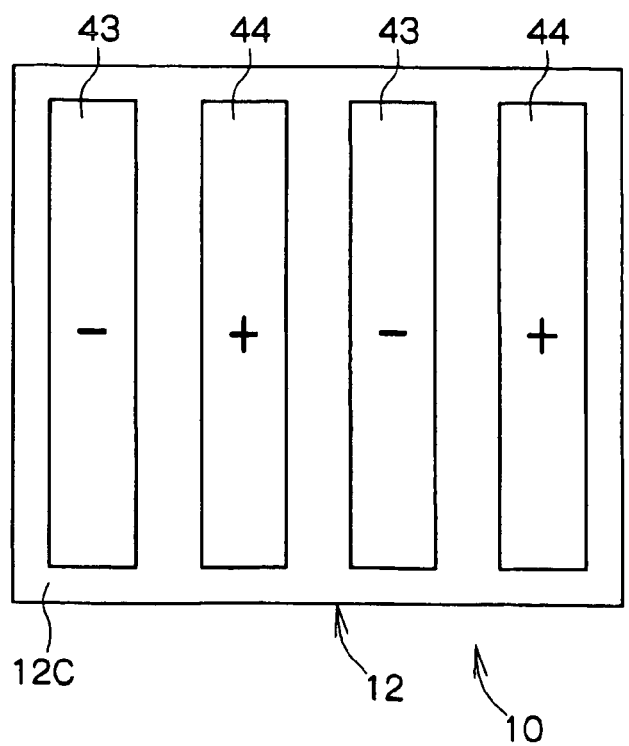

As shown in FIG. 5, two kinds of external electrodes 43, 44 are both provided in plurality on the upper face 12D of the dielectric element 12. Out of the leadout portions 21C, 21D, 25C, 25D corresponding to first external-side leadout portions and the leadout portions 23A, 23B corresponding to third external-side leadout portions, all of which are led out to the upper face 12D as shown in FIG. 4, the leadout portions 21C, 25C and the leadout portions 23A are connected to one external electrode 43 formed to extend linearly. The leadout portions 21D, 25D and the leadout portions 23B are connected to the other external electrode 43 formed to extend linearly.

Further, out of the leadout portions 22C, 22D, 26C, 26D corresponding to second external-side leadout portions and the leadout portions 24A, 24B corresponding to fourth external-side leadout portions, all of which are led out to the upper face 12D as shown in FIG. 4, the leadout portions 22C, 26C and the leadout portion 24A are connected to one external electrode 44 formed to extend linearly. Further, the leadout portions 22D, 26D and the leadout portions 24B are connected to the other external electrode 44 formed to extend linearly.

As described above, in the multilayer capacitor 10 of this embodiment, two kinds of the terminal electrodes 41, 42 are both provided in plurality on the lower face 12C out of two faces opposite to each other of the dielectric element 12 formed in a hexahedron shape which is a rectangular parallelepiped shape. Further, the internal conductors 21 to 26 in the dielectric element 12 are set perpendicular to the lower face 12C that is a face to be mounted on a multilayer substrate 50 shown in FIG. 6.

The terminal electrodes 42 are connected to electrodes of, for example, a CPU and the terminal electrodes 41 are connected to, for example, a ground side so that the respective internal conductors 21 to 26 serve as electrodes of the capacitor. Therefore, these terminal electrodes 41, 42 adjacent to each other are different in polarity when used.

Specifically, the multilayer capacitor 10 is soldered to the multilayer substrate 50 shown in FIG. 6 with the internal conductors 21 to 26 being set perpendicular to the multilayer substrate 50, the terminal electrodes 41 are connected to a wiring 51 corresponding to a ground-side wiring connected to a ground layer of the multilayer substrate 50, and the terminal electrodes 42 are connected to wirings 52 corresponding to power source side wirings connected to a power source layer. Accordingly, for example, the terminal electrodes 41 have negative polarity and the terminal electrodes 42 have positive polarity, so that the terminal electrodes with the same polarity are arranged in a zigzag pattern as shown in FIG. 7(A). The external electrodes 43 have negative polarity and the external electrodes 44 have positive polarity.

Next, the operation of the multilayer capacitor 10 according to this embodiment will be described.

According to the multilayer capacitor 10 of this embodiment, the dielectric element 12 is formed in a rectangular parallelepiped shape by stacking the plural dielectric sheets which are to be the ceramic layers 12A respectively. In this dielectric element 12, the internal conductors 21, 25 and the internal conductors 22, 26 corresponding to two kinds of terminal internal conductors, and the internal conductors 23 and the internal conductors 24 corresponding to two kinds of connecting internal conductors are arranged, being separated from each other by the ceramic layers 12A.

Further, the lower face 12C and the upper face 12D constitutes two faces opposite to each other of the dielectric element 12. The internal conductors 21, 25 have leadout portions 21A, 21B, 25A, 25B led out to the lower face 12C and the leadout portions 21C, 21D, 25C, 25D led out to the upper face 12D. Similarly, the internal conductors 22, 26 have the leadout portions 22A, 22B, 26A, 26B led out to the lower face 12C and the leadout portions 22C, 22D, 26C, 26D led out to the upper face 12D. Further, the internal conductors 23 have the leadout portions 23A, 23B led out to the upper face 12D, and the internal conductors 24 have the leadout portions 24A, 24B led out to the upper face 12D.

Two kinds of the terminal electrodes 41, 42 are both provided in plurality on the lower face 12C of the dielectric element 12. Among them, the terminal electrodes 41 are individually connected to the leadout portions 21A, 21B, 25A, 25B, and the terminal electrodes 42 are individually connected to the leadout portions 22A, 22B, 26A, 26B.

Further, two kinds of the external electrodes 43, 44 are both provided in plurality on the upper face 12D of the dielectric element 12. Among them, the external electrodes 43 are connected to the leadout portions 21C, 25C and the leadout portion 23A, and the leadout portions 21D, 25D and the leadout portion 23B, respectively, and the external electrodes 44 are connected to the leadout portions 22C, 26C and the leadout portion 24A, and the leadout portions 22D, 26D and the leadout portion 24B, respectively.

In this embodiment, these internal conductors 21, 22 form the multilayer block 31, and the internal conductors 25, 26 form the multilayer block 33. Accordingly, the multilayer blocks 31, 33 form the plural first multilayer blocks respectively. The internal conductors 23, 24 form the second multilayer block which is the multilayer block 32. Therefore, the dielectric element 12 has the multilayer structure in which the second multilayer block is interposed between the first multilayer blocks.

As described above, the terminal electrodes 41 of one kind are individually connected to the internal conductors 21, 25 via the leadout portions 21A, 21B, 25A, 25B, and the terminal electrodes 42 of the other kind are individually connected to the internal conductors 22, 26 via the readout portions 22A, 22B, 26A, 26B.

Meanwhile, the external electrodes 43 of one kind are connected to the internal conductors 21, 25 via the leadout portions 21C, 21D, 25C, 25D and are connected to the internal conductors 23 via the leadout portions 23A, 23B. The external electrodes 44 of the other kind are connected to the internal conductors 22, 26 via the leadout portions 22C, 22D, 26C, 26D and are connected to the internal conductors 24 via the leadout portions 24A, 24B.

As a result, obtained is the structure such that not only the internal conductors 21, 22, 25, 26 connected via two kinds of the terminal electrodes 41, 42 to the multilayer substrate 50 which is provided outside the multilayer capacitor 10 but also two kinds of the internal conductors 23, 24 connected to the internal conductors 21, 22, 25, 26 via the external electrodes 43, 44 are disposed in the dielectric element 12. This structure eliminates a multilayer block not functioning as a capacitor in the dielectric element 12.

On the lower face 12C of the dielectric element 12 of the multilayer capacitor 10, two kinds of the terminal electrodes 41, 42 are alternately arranged, so that the terminal electrodes 41, 42 adjacent to each other become different in polarity. Accordingly, as for the directions of currents flowing into the terminal electrodes 41, 42, the directions in the terminal electrodes 41, 42 adjacent to each other become reverse to each other, so that a magnetic flux canceling effect acts between the adjacent terminal electrodes 41, 42 to reduce ESL.

As described above, in the multilayer capacitor 10 having the structure of this embodiment, not only ESL is reduced but also no multilayer block not functioning as a capacitor exists in the dielectric element 12. This realizes larger capacitance than that of a conventional multilayer capacitor. Therefore, according to this embodiment, it is possible to obtain the multilayer capacitor 10 easily realizing a higher capacity as well as reduced ESL, so that a higher effect as a power source of a CPU can be obtained.

Further, in this embodiment, the dielectric element 12 has the multilayer structure in which the multilayer block 32 corresponding to the second multilayer block without any leadout portion led out to the lower face 12C of the dielectric element 12 on which the terminal electrodes 41, 42 exist is interposed between the multilayer blocks 31, 33 each corresponding to the first multilayer block. Accordingly, it is possible to secure a gap between two kinds of the terminal electrodes 41, 42 disposed on the lower face 12C.

Moreover, in this embodiment, two kinds of the terminal electrodes 41, 42 are both provided in plurality, and two kinds of the terminal electrodes 41, 42 are arranged on the lower face 12C of the dielectric element 12, with the terminal electrodes 41, 42 different in kind being adjacent to each other. Therefore, two kinds of the terminal electrodes 41, 42 are both arranged in the zigzag pattern on the lower face 12C, and accordingly, the terminal electrodes with the same polarity exist in the zigzag pattern.

Therefore, two kinds of the terminal electrodes 41, 42 are alternately arranged in the zigzag pattern, so that the magnetic flux canceling effect acts more strongly between the adjacent terminal electrodes to further reduce ESL.

Next, a second embodiment of the multilayer capacitor according to the present invention will be described based on FIG. 8 to FIG. 10. The same reference numerals and symbols are used to designate the same members as those described in the first embodiment, and repeated explanation thereof will be omitted.

Figure 8:
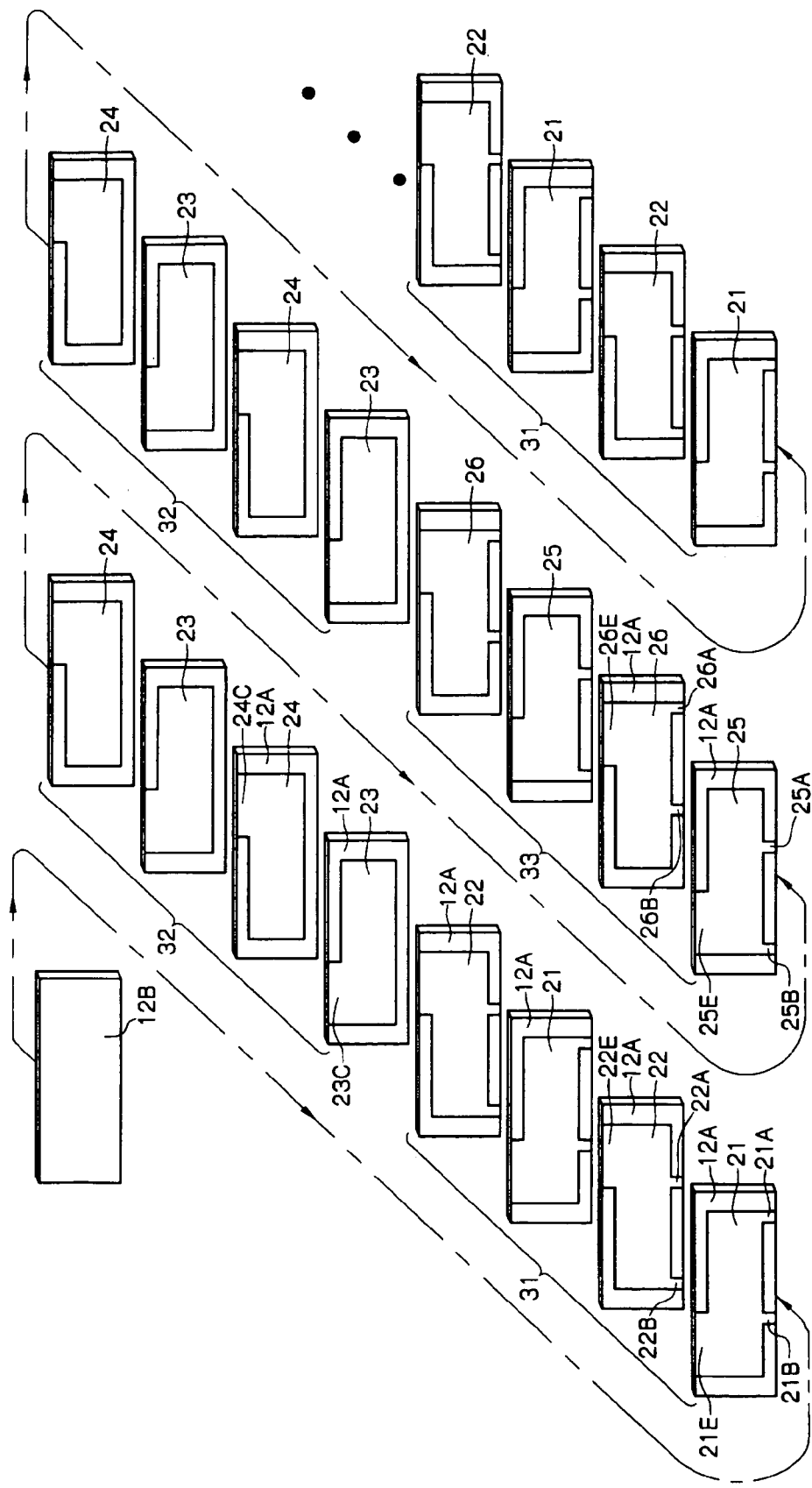
FIG. 8 is an exploded perspective view showing a multilayer capacitor according to a second embodiment of the present invention.
Figure 9:
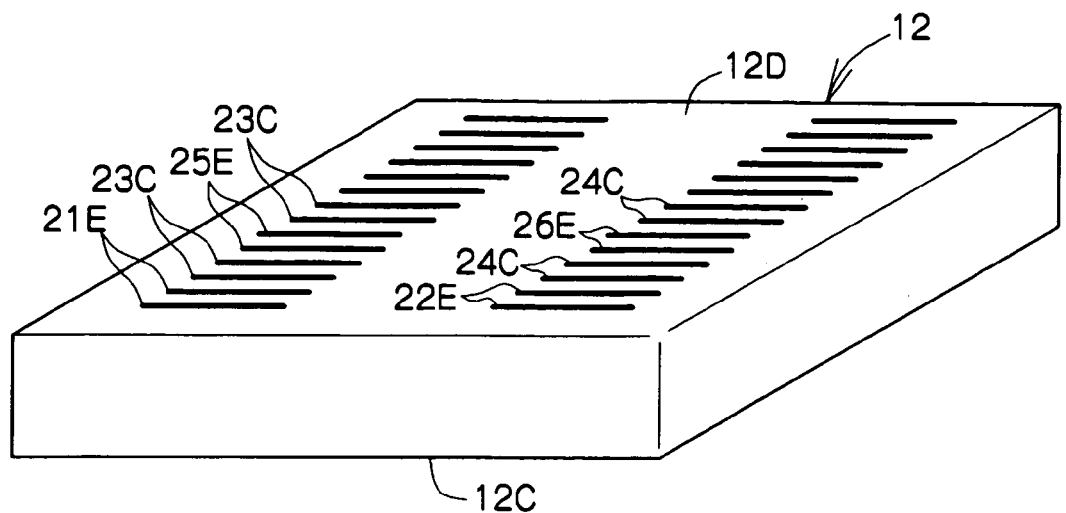
FIG. 9 is a perspective view of the multilayer capacitor according to the second embodiment of the present invention seen from the top before external electrodes are mounted thereon.

As shown in FIG. 8 and FIG. 9, a multilayer capacitor 10 of this embodiment is substantially the same as that of the first embodiment, but it has one leadout portion 21E led out to an upper face 12D from a leftward portion of the internal conductor 21 in place of the two readout portions 21C, 21D, which are led out to the upper face 12D, of the internal conductor 21. Similarly, it has one leadout portion 22E led out to the upper face 12D from a rightward portion of the internal conductor 22 in place of the two leadout portions 22C, 22D, which are led out to the upper face 12D, of the internal conductor 22.

Similarly, it has one leadout portion 23C led out to the upper face 12D from a leftward portion of the internal conductor 23 in place of the two readout portions 23A, 23B, which are led out to the upper face 12D, of the internal conductor 23. Further, it similarly has one leadout portion 24C led out to the upper face 12D from a rightward portion of the internal conductor 24 in place of the two readout portions 24A, 24B, which are led out to the upper face 12D, of the internal conductor 24.

Similarly, it has one leadout portion 25E led out to the upper face 12D from a leftward portion of the internal conductor 25 in place of the two readout portions 25C, 25D, which are led out to the upper face 12D, of the internal conductor 25. Further, it similarly has one leadout portion 26E led out to the upper face 12D from a rightward portion of the internal conductor 26 in place of the two readout portions 26C, 26D, which are led out to the upper face 12D, of the internal conductor 26.

Figure 10:
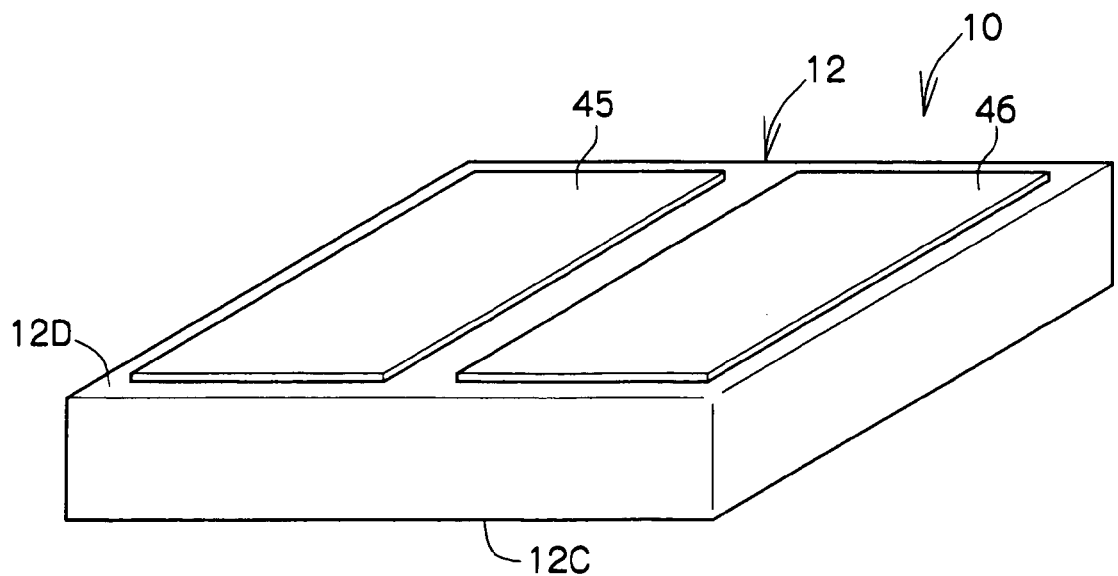
FIG. 10 is a perspective view of the multilayer capacitor according to the second embodiment of the present invention seen from the top.
Figure 11:
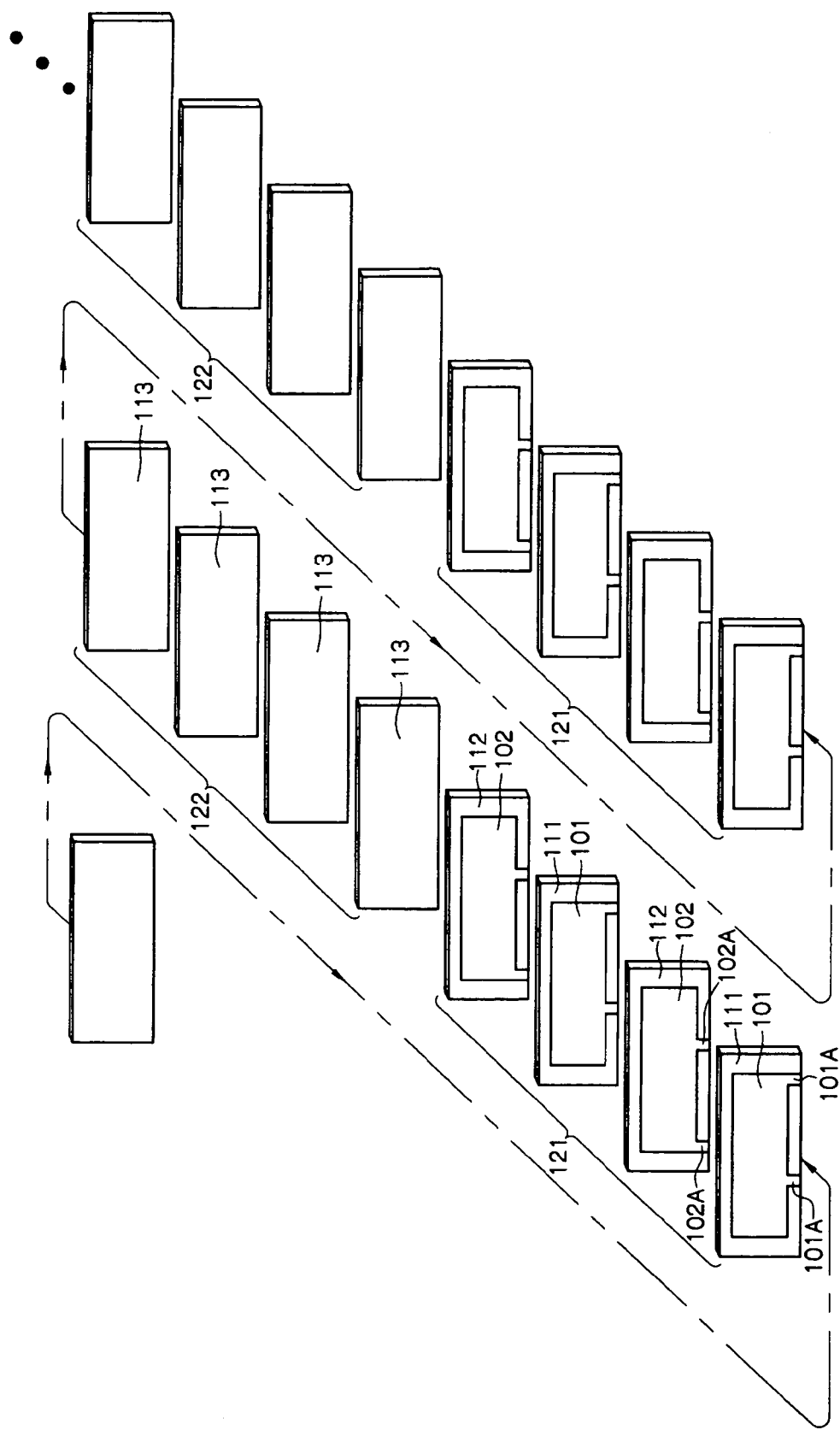
FIG. 11 is an exploded perspective view showing a multilayer capacitor of a conventional example.
Figure 12:
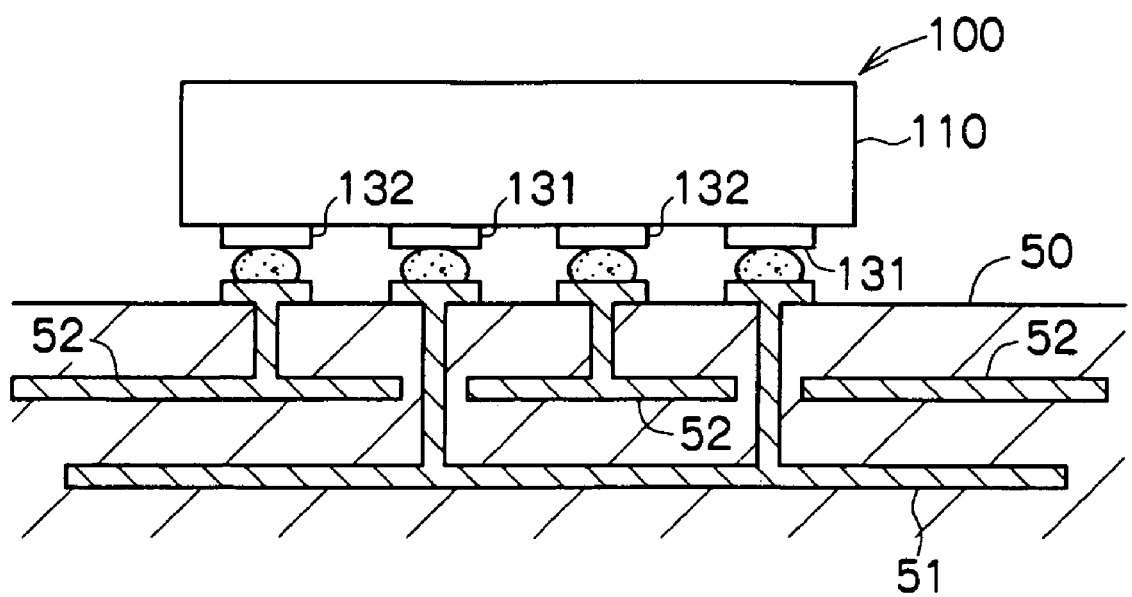
FIG. 12 is a front view showing the state when the multilayer capacitor of the conventional example is mounted on a multilayer substrate.

Accordingly, in this embodiment, two kinds of external electrodes, namely, one external electrode 45 and one external electrode 46 each formed to extend linearly are disposed on the upper face 12D of a dielectric element 12 in place of two kinds of the external electrodes 43, 44 as shown in FIG. 10. The readout portions 21E, 23C, 25E are connected to the external electrode 45 and the readout portions 22E, 24C, 26E are connected to the external electrode 46.

Therefore, the multilayer capacitor 10 of this embodiment also has the same operation and effect as those of the first embodiment. Moreover, the shape thereof is simplified in this embodiment, leading to the reduction in production cost of the multilayer capacitor 10.

It should be noted that the multilayer capacitors 10 according to the above-described embodiments are not limited to the above-described number of layers, shape of the internal conductors, number and shape of the terminal electrodes, and number and shape of the external electrodes, but may have other shapes, and moreover, may be structured to have a larger number of layers, a larger number of terminal electrodes, and a larger number of external electrodes.

According to the present invention, it is possible to obtain a multilayer capacitor easily realizing a higher capacity as well as reduced ESL, so that a multilayer capacitor for a power source of a CPU can have a higher effect.

What is claimed is:

1. A multilayer capacitor comprising:
   a dielectric element formed of a stack of dielectric layers to be in a rectangular parallelepiped shape;
   two kinds of terminal internal conductors and two kinds of connecting internal conductors disposed in the dielectric element, being separated from each other by the dielectric layer;
   two kinds of terminal electrodes disposed on one face out of two faces opposite to each other of the dielectric element; and
   two kinds of external electrodes disposed on the other face of the dielectric element,
   wherein the terminal internal conductor of one kind has a first terminal-side leadout portion led out to the one face out of the two faces opposite to each other of the dielectric element and a first external-side leadout portion led out to the other face, and the terminal internal conductor of the other kind has a second terminal-side leadout portion led out to the one face and a second external-side leadout portion led out to the other face,
   wherein the connecting internal conductor of one kind has a third external-side leadout portion led out to the other face, and the connecting internal conductor of the other kind has a fourth external-side leadout portion led out to the other face;
   wherein the terminal electrode of one kind is connected to the first terminal-side leadout portion and all first terminal-side leadout portions are electrically joined, and the terminal electrode of the other kind is connected to the second terminal-side leadout portion and all second terminal-side leadout portions are electrically joined; and wherein the external electrode of one kind is connected to the first external-side leadout portion and the third external-side leadout portion, and the external electrode of the other kind is connected to the second external-side leadout portion and the fourth external-side leadout portion.

2. The multilayer capacitor according to claim 1, wherein the dielectric element is formed of the stack of the dielectric layers that are ceramic layers to be in the rectangular parallelepiped formed.

3. The multilayer capacitor according to claim 1, wherein two kinds of the terminal internal conductors and two kinds of the connecting internal conductors are both provided in plurality in the dielectric element.

4. The multilayer capacitor according to claim 1, wherein the terminal internal conductor of the one kind has the plural first terminal-side leadout portions, and the terminal internal conductor of the other kind has the plural second terminal-side leadout portions.

5. The multilayer capacitor according to claim 1, wherein the terminal internal conductor of the one kind has the plural first external-side leadout portions and the terminal internal conductor of the other kind has the plural second external-side leadout portions, and the connecting internal conductor of the one kind has the plural third external-side leadout portions and the connecting internal conductor of the other kind has the plural fourth external-side leadout portions.

6. The multilayer capacitor according to claim 5, wherein the external electrodes of the one kind are provided on the other face of the dielectric element in plurality so as to correspond to the number of the first external-side leadout portions and the third external-side leadout portions, and the external electrodes of the other kind are provided on the other face of the dielectric element in plurality so as to correspond to the number of the second external-side leadout portions and the fourth external-side leadout portions.

7. The multilayer capacitor according to claim 1, wherein the terminal internal conductor of the one kind has the single first external-side leadout portion and the terminal internal conductor of the other kind has the single second external-side leadout portion, and the connecting internal conductor of the one kind has the single third external-side leadout portion and the connecting internal conductor of the other kind has the single fourth external-side leadout portion.

8. The multilayer capacitor according to claim 7, wherein the single external electrode of the one kind is provided on the other face of the dielectric element so as to correspond to the number of the first external-side leadout portion and the third external-side leadout portion, and the single external electrode of the other kind is provided on the other face of the dielectric element so as to correspond to the number of the second external-side leadout portion and the fourth external-side leadout portion.

9. The multilayer capacitor according to claim 1, wherein the multilayer capacitor is mountable with the one face of the dielectric element facing an external substrate while the terminal electrode of the one kind is connected to a ground-side wiring of the external substrate and the terminal electrode of the other kind is connected to a power source side wiring of the external substrate.

10. The multilayer capacitor according to claim 1, wherein said two kinds of terminal electrodes join the respective terminal side leadout portions together.

11. The multilayer capacitor according to claim 10, wherein said two kinds of terminal electrodes are planar conductors mounted on the one face of the dielectric element.

12. The multilayer capacitor according to claim 11, wherein said two kinds of terminal electrodes are arranged substantially in parallel.

13. The multilayer capacitor according to claim 1, wherein all first and third external-side leadout portions are electrically joined by the external electrode of one kind and all the second and fourth external side leadout portions are electrically joined by the external electrode of the other kind.

14. The multilayer capacitor according to claim 13, wherein said two kinds of external electrodes are planar conductors on the other face of the dielectric element.

15. The multilayer capacitor according to claim 14, wherein said two kinds of external electrodes are arranged substantially in parallel.

16. A multilayer capacitor comprising:
a dielectric element formed of a stack of dielectric layers to be in a rectangular parallelepiped shape;
two kinds of terminal internal conductors and two kinds of connecting internal conductors disposed in the dielectric element, being separated from each other by the dielectric layer;
two kinds of terminal electrodes disposed on one face out of two faces opposite to each other of the dielectric element; and
two kinds of external electrodes disposed on the other face of the dielectric element,
wherein two kinds of the terminal internal conductors form a plurality of first multilayer blocks, and two kinds of the connecting internal conductors form at least one second multilayer block, the second multilayer block being interposed between the first multilayer blocks;
wherein the terminal internal conductor of one kind has a first terminal-side leadout portion led out to the one face out of the two faces opposite to each other of the dielectric element and a first external-side leadout portion led out to the other face, and the terminal internal conductor of the other kind has a second terminal-side leadout portion led out to the one face and a second external-side leadout portion led out to the other face;
wherein the connecting internal conductor of one kind has a third external-side leadout portion led out to the other face, and the connecting internal conductor of the other kind has a fourth external-side leadout portion led out to the other face;
wherein the terminal electrode of one kind is connected to the first terminal-side leadout portion, and the terminal electrode of the other kind is connected to the second terminal-side leadout portion; and
wherein the external electrode of one kind is connected to the first external-side leadout portion and the third external-side leadout portion, and the external electrode of the other kind is connected to the second external-side leadout portion and the fourth external-side leadout portion.

17. The multilayer capacitor according to claim 16, wherein two kinds of the terminal internal conductors forming each of the first multilayer blocks are both provided in plurality in each of the first multilayer blocks.

18. The multilayer capacitor according to claim 16, wherein the two first multilayer blocks sandwiching the second multilayer block are different in an arrangement of the first terminal-side leadout portion and the second terminal-side leadout portion in two kinds of the terminal internal conductors.

19. The multilayer capacitor according to claim 16, wherein two kinds of the connecting internal conductors forming each of the second multilayer blocks are both provided in plurality in each of the second multilayer blocks.

20. The multilayer capacitor according to claim 16, wherein the first multilayer blocks each formed of two kinds of the terminal internal conductors and the second multilayer blocks each formed of two kinds of the connecting internal conductors are both provided in plurality.

21. A multilayer capacitor comprising:
a dielectric element formed of a stack of dielectric layers to be in a rectangular parallelepiped shape;
two kinds of terminal internal conductors and two kinds of connecting internal conductors disposed in the dielectric element, being separated from each other by the dielectric layer;
two kinds of terminal electrodes disposed on one face out of two faces opposite to each other of the dielectric element; and
two kinds of external electrodes disposed on the other face of the dielectric element,
wherein the terminal internal conductor of one kind has a first terminal-side leadout portion led out to the one face out of the two faces opposite to each other of the dielectric element and a first external-side leadout portion led out to the other face, and the terminal internal conductor of the other kind has a second terminal-side leadout portion led out to the one face and a second external-side leadout portion led out to the other face;
wherein the connecting internal conductor of one kind has a third external-side leadout portion led out to the other face, and the connecting internal conductor of the other kind has a fourth external-side leadout portion led out to the other face;
wherein two kinds of the terminal electrodes are both provided in plurality on the one face of the dielectric element, and wherein the terminal electrodes are arranged in rows and columns and each adjacent terminal electrode in a row or a column has a different polarity;
wherein the terminal electrode of one kind is connected to the first terminal-side leadout portion, and the terminal electrode of the other kind is connected to the second terminal-side leadout portion; and
wherein the external electrode of one kind is connected to the first external-side leadout portion and the third external-side leadout portion, and the external electrode of the other kind is connected to the second external-side leadout portion and the fourth external-side leadout portion.

22. The multilayer capacitor according to claim 21, wherein each of two kinds of the terminal electrodes is formed in a quadrangle shape, and two kinds of the terminal electrodes are arranged closely to one another on the one face of the dielectric element.

23. The multilayer capacitor according to claim 21, wherein the terminal electrode of one kind is integrally connected to the plural first terminal-side leadout portions, and the terminal electrode of the other kind is integrally connected to the plural second terminal-side leadout portions.

24. The multilayer capacitor according to claim 21, wherein the dielectric element is formed by the stack of the dielectric layers that are ceramic layers to be in the rectangular parallelepiped.

25. The multilayer capacitor according to claim 21, wherein two kinds of the terminal internal conductors and two kinds of the connecting internal conductors are both provided in plurality in the dielectric element.

26. The multilayer capacitor according to claim 21, wherein the terminal internal conductor of the one kind has the plural first terminal-side leadout portions, and the terminal internal conductor of the other kind has the plural second terminal-side leadout portions.

* * * * *